United States Patent Office 3,799,872
Patented Mar. 26, 1974

3,799,872
OIL-WATER SEPARATION
Raymond E. Hargis and Donald O. Bartley, Tyler, Tex.,
assignors to Howe-Baker Engineers, Inc., Tyler, Tex.
No Drawing. Filed Jan. 16, 1973, Ser. No. 324,019
Int. Cl. B01d 11/00
U.S. Cl. 210—21                                    8 Claims

ABSTRACT OF THE DISCLOSURE

A method for separating the oil fraction from the aqueous fraction in an oil-containing aqueous stream by contacting the stream with 5 to 20% by volume of a low boiling hydrocarbon liquid and 5 to 100 p.p.m. by volume of a liquid surfactant composition.

INTRODUCTION

This invention relates to a method for separating the oil fraction from the aqueous fraction in an oil-containing aqueous stream. More specifically, this invention teaches a method for treating and separating the oil fraction from oil-containing aqueous streams which usually contain no more than about 1% by volume of oil, but which can contain as much as 5% oil by volume, or higher.

During the course of refining and processing crude oil, large quantities of water are used for many purposes. During the course of its use, the water stream comes in contact with oil, the result being that the oil may become emulsified, suspended or absorbed with water. Usually, the amount of oil does not exceed 1% by volume of the oil-containing aqueous stream. Oil may be emulsified with the aqueous stream due to the presence of emulsifiers, soaps or other chemicals as well as due to agitation from mixing and turbulent flow. In addition to emulsified oil, oil may also be absorbed and/or suspended within the stream. Both of these phenomena are well known in the art and either may occur depending upon the make-up and past history of the stream.

Until recent years, the water that was used in oil production and oil processing became contaminated with oil and was discharged into nearby lakes, rivers or streams. However, as a result of widespread national, state and local pollution legislation, this practice is no longer acceptable. Due to the fact that billions of gallons of oil-containing aqueous streams are processed daily, this has presented a major problem to the refinery industry.

It was, therefore, necessary to develop a method by which the oil content of the aqueous streams could be reduced to a low enough level so that the stream could be discharged into bodies of water or recycled to be re-used in the refinery. Generally, it is desirable to reduce the oil content to less than 25 p.p.m., by volume.

Various methods have been suggested and used in order to eliminate the problem described above. U.S. 2,773,003 teaches countercurrent contacting with steam and treatment of the aqueous stream with hydrocarbons to remove phenols from water streams.

U.S. 3,449,244 teaches a method for purifying impure water from an operation which includes the oil quenching of hydrocarbons by contacting the impure water with a low boiling hydrocarbon, gravitationally separating the resulting hydrocarbon phase and stripping the resulting aqueous phase. These and the other methods taught in the prior art are expensive, time consuming and inefficient.

One specific problem encountered using the techniques taught by the prior art is the inability to remove the thick foamy interface, a so-called "rag," between the oil-water phases. This "rag" is composed of water, oil, and possibly some particulate matter such as, for example, iron sulfides which may be present in the stream. The "rag" is difficult to resolve and generally may require several hours of gravity separation. Oftentimes, the "rag" does not resolve at all. It is desirable to develop a quick, efficient method for separating the oil fraction from the aqueous fraction in an oil-containing aqueous stream. Furthermore, it is quite desirable to develop a process for resultion of the "rag" at the oil-water interface.

OBJECTS

It is therefore an object of this invention to provide an improved method for separating the oil fraction from the aqueous fraction in an oil-containing aqueous stream.

It is also an object of this invention to provide a method for separating the oil fraction from the aqueous fraction in an aqueous stream containing no more than about 5% by volume of oil.

Another object of this invention is to provide a method for separating the oil fraction from the aqueous fraction in an oil-containing aqueous stream so that the oil content is reduced to less than 25 p.p.m., by volume.

Other objects will appear hereinafter.

THE INVENTION

This invention relates to a method for separating the oil fraction from the aqueous fraction in an oil-containing aqueous stream. As mentioned above, in general, the stream contains relatively small amounts of oil, usually no more than about 1% by volume. Of course, the method taught by this invention is applicable to streams which contain greater than 1% by volume, e.g., 5% by volume or higher.

This method involves contacting the oil-containing stream with:

(A) From 5 to 20% by volume of a low boiling, essentially water insoluble, liquid hydrocarbon which boils between 150 to 600° F., and
(B) From 5 to 100 p.p.m. by volume of a liquid surfactant composition comprising:
    (1) from 5 to 50% by weight of hexamethylene diamine bottoms formed by reacting hexamethylene diamine with ethylene glycol, propylene glycol or a mixture thereof in an aqueous solution wherein the ratio of the hexamethylene diamine to the glycol is 2:1 to 1:2 to form a reaction product, and then reacting the reaction product with 10 to 90% by weight of dichlorobutene;
    (2) 20 to 80% by weight of water;
    (3) 10 to 25% by weight of a water-soluble zinc salt; and
    (4) 5 to 15% by weight of a water-soluble alcohol having from 2 to 6 carbon atoms, and then separating the resulting oil fraction from the resulting aqueous fraction.

The treatment of the oil-containing aqueous stream with the hydrocarbon liquid and the liquid surfactant composition may be either simultaneous or sequential. Either may be added prior to the other, and likewise, both may be added to the stream at the same time.

HYDROCARBON LIQUID

The hydrocarbon liquids used in this invention have relatively low boiling points, generally within the range 140° to 600° F. The preferred boiling point range is between 140° to 212° F. The hydrocarbon liquids are characterized as being essentially water insoluble, that is, the hydrocarbon liquid and water are readily separable.

Useful hydrocarbon liquids include paraffins such as pentane, hexane, isohexane, heptane, octane, nonane, decane, and cyclohexane, their mixtures as well as petroleum fractions such as light naphtha, gasoline, kerosene, and their mixtures. In addition to those mentioned above, catalytic cracked naphthas boiling between 100 to 500° F. are capable of being used in the practice of this invention.

THE LIQUID SURFACTANT

The liquid surfactant composition is composed of four components as defined above. The first is commonly referred to as hexamethylene diamine bottoms. The hexamethylene diamine bottoms is formed by a two-step reaction. The first step involves the reaction of hexamethylene diamine with ethylene glycol, propylene glycol, or a mixture of the two to form a reaction product. The reaction generally is performed in water wherein the volume ratio of hexamethylene diamine to the glycol between is 2:1 to 1:2. The preferred reaction takes place where the volume ratio is 1:1. A typical reaction would be performed when the amine-glycol-water volume ratio is 1:1:1. The reaction may be performed at from 80 to 200° C. in ½ to 10 hours.

After the reaction product of hexamethylene diamine and the glycol is formed the second step of further cross-linking is completed by reacting the reaction product with dichlorobutene. Dichlorobutene is added to the reaction product in a concentration of from 10 to 90% by weight. The preferred concentration is 30 to 50% by weight. This reaction may also be performed at 80 to 200° C. in ½ to 10 hours. It should be noted that the reaction conditions listed are typical conditions and should not be limited to the ranges given. Temperatures and reaction times may vary over a wide range depending upon the concentrations used.

After completion of the two-step reaction the product is neutralized with a dilute inorganic acid solution. Any inorganic acid may be used for neutralization. Preferably hydrochloric acid or sulfuric acid are used.

The other substituents of the liquid surfactant composition are 20 to 80% by weight water, 10 to 25% by weight of a water-soluble zinc salt and 5 to 15% by weight of a water-soluble alcohol having from 2 to 6 carbon atoms.

The zinc salts useful in this invention are water-soluble and are capable of forming ions in solution. Any water-soluble zinc sale would be useful in this invention and should not be limited to any one type. Typically useful salts are zinc chloride, zinc sulfate, zinc nitrates, and zinc nitrite.

Alcohols which are useful in the practice of this invention include propanol, butanol, pentanol, isopropanol, hexanol and isobutanol. The preferred alcohol used in the invention is isopropanol.

As mentioned above the oil-containing aqueous stream may be treated with the hydrocarbon liquid and the liquid surfactant composition either simultaneously or sequentially.

In general, the stream is treated with 5 to 20% by volume of the hydrocarbon liquid and preferably 5 to 10% by volume.

PROCEDURE

The hydrocarbon liquid is added to the oil-containing aqueous stream at a rate of 5–20%¹ by volume of the aqueous stream. The concentration of liquid surfactant composition is 5 to 100 p.p.m. by volume, preferably about 10 p.p.m. As mentioned above, the hydrocarbon liquid and liquid surfactant composition may be added to the stream simultaneously or sequentially.

The oil-containing aqueous stream temperature may be kept within the range of 65 to 140° F. and under a pressure of 10 to 50 p.s.i.g. Usually the temperature is between 100 to 140° F. It is important not to heat the stream above the boiling points of any of the liquids involved, at the operating pressure, in the treatment, namely the water or the hydrocarbon liquid.

Once the aqueous stream has been contacted with the hydrocarbon liquid and liquid surfactant composition under the conditions described above it is necessary to have a 1- to 15-minute residence time during which the entire mixture is subjected to mild agitation. Typically the period of agitation is 1 to 5 minutes. After this agitation, which can be accomplished by conventional turbine-type, multi-stage mixers, and is characterized as low-shear type mixing, the oil fraction is separated from the aqueous fraction. The fractions will separate by gravity in a very short period of time; usually 10 to 15 minutes. Gravity separation may be employed, but more sophisticated methods such as centrifugation may be used.

Another technique that has been found to be useful in effecting a rapid separation is that of applying an electric field. Oftentimes it may be absolutely necessary to employ an electric field to effect a complete separation and eliminate the "rag" at the hydrocarbon-water interface. An electrical field having a D.C. voltage of 5,000 to 30,000 v. is applied to the stream. The preferred voltage is 10,000 v. It has been determined that by applying this electrical field, the "rag" between the hydrocarbon-water interface is resolved more rapidly.

The following examples illustrate specific embodiments of the invention.

EXAMPLE 1

To a 2-liter autoclave was added 100 ml. of water, 100 ml. of hexamethylene diamine and 100 ml. ethylene glycol. The reactor was heated at 90° C. under a pressure of 50 p.s.i.g. for one hour. Then 150 ml. of dichlorobutene was added and the reaction continued for one hour at 85 to 90° C. and 50 p.s.i.g. The pH of the final reaction mixture was greater than 11. The pH was adjusted to 7.3 with a 5% hydrochloric acid solution.

A 25 gram portion of the composition prepared above was added to a 500 ml. beaker. Twenty grams of water were added as well as 10 grams of isopropanol and 25 grams of zinc chloride which was dissolved in 20 grams of water. The entire mixture was blended for one hour using a motor powered mixer.

EXAMPLE 2

Effluent samples of oil-containing aqueous streams were obtained from oil wells located in east Texas. These samples had varying oil contents and were tested with the method taught in this invention. Results are tabulated in Table I. The surfactant composition used was that prepared in Example 1.

TABLE I

| Feed oil p.p.m. by volume content | Hydrocarbon liquid injection rate, volume percent | Surfactant concentration p.p.m. by volume | Mixing time¹ | Separation time¹ | Product oil content, p.p.m. by volume |
|---|---|---|---|---|---|
| 1,500 | 10 | 10 | 1 | 15 | 12 |
| 1,500 | 10 | 10 | 1 | 15 | 13 |
| 1,500 | 10 | 10 | 1 | 15 | 12 |
| 5,700 | 20 | 10 | 1 | 15 | 7 |
| 3,000 | 10 | 10 | 1 | 15 | 8 |
| 39,000 | 15 | 10 | 1 | 15 | 19 |
| 39,000 | 15 | 16 | 1 | 15 | 16 |
| 310 | 10 | 10 | 1 | 15 | 10 |
| 310 | 10 | None | 1 | 15 | 93 |

¹ Minutes.

A voltage of 10,000 volts D.C. was applied to all examples in Table I.

The hydrocarbon liquid used to obtain the above results was hexane.

The experiments performed in Table I were also performed without the application of the electrical field. It was visually determined that the interface between the hydrocarbon-water phases was not a clear and distinct interface.

What is claimed is:

1. A method for separating the oil fraction from the aqueous fraction in an oil-containing aqueous stream by contacting said stream with:

(A) from 5 to 20% by volume of a liquid hydrocarbon boiling between 140 to 600° F., and
(B) from 5 to 100 p.p.m. by volume of a liquid surfactant composition comprising:
  (1) from 5 to 50% by weight of hexamethylene diamine bottoms formed by reacting hexamethylene diamine with ethylene glycol, propylene glycol or a mixture thereof in an aqueous solution wherein the volume ratio of said hexamethylene diamine to said glycol is 2:1 to 1:2 to form a reaction product and then reacting said reaction production with 10 to 90% by weight of dichlorobutene;
  (2) 20 to 80% by weight of water;
  (3) 10 to 25% by weight of a water-soluble zinc salt; and
  (4) 5 to 15% by weight of a water-soluble alcohol having from 2 to 6 carbon atoms,
and then separating the resulting oil fraction from the resulting aqueous fraction.

2. A method of claim 1 wherein said hydrocarbon liquid is hexane.

3. A method of claim 1 wherein said hydrocarbon liquid boils between 140–212° F.

4. A method of claim 1 wherein the alcohol of step "B(4)" is isopropanol.

5. A method for separating the oil fraction from the aqueous fraction in an oil-containing aqueous stream by contacting said stream with:
(A) from 5 to 20% by volume of a hydrocarbon liquid boiling between 140 to 600° F., and
(B) from 5 to 100 p.p.m. by volume of a liquid surfactant composition comprising:
  (1) from 5 to 50% by weight of hexamethylene diamine bottoms formed by reacting hexamethylene diamine with ethylene glycol, propylene glycol or a mixture thereof in an aqueous solution wherein the volume ratio of said hexamethylene diamine to said glycol is 2:1 to 1:2 to form a reaction product and then reacting said reaction product with 10 to 90% by weight of dichlorobutene;
  (2) 20 to 80% by weight of water;
  (3) 10 to 25% by weight of a water-soluble zinc salt; and
  (4) 5 to 15% by weight of a water-soluble alcohol having from 2 to 6 carbon atoms,
and then applying an electrical field having a D.C. voltage of 5,000 to 30,000 v. to said stream thereby separating the resulting oil fraction from the resulting aqueous fraction.

6. A method of claim 5 wherein said hydrocarbon is hexane.

7. A method of claim 5 wherein said hydrocarbon is kerosene.

8. A method of claim 5 wheerin said D.C. voltage is 10,000 v.

References Cited
UNITED STATES PATENTS

| | | | |
|---|---|---|---|
| 2,568,741 | 9/1951 | Kirkpatrick et al. | 252—329 |
| 2,568,742 | 9/1951 | Kirkpatrick et al. | 252—329 |
| 2,615,852 | 10/1952 | Kocher | 252—329 |

FRANK A. SPEAR, Jr., Primary Examiner

F. LANDER, Assistant Examiner